United States Patent [19]
Bernier et al.

[11] Patent Number: 5,660,612
[45] Date of Patent: Aug. 26, 1997

[54] COMPOST DECONTAMINATION OF DDT CONTAMINATED SOIL

[75] Inventors: Roger L. Bernier, Montreal; Neil C. C. Gray, Oakville; Lori E. Moser, Guelph, all of Canada

[73] Assignee: Zeneca Corp., Stoney Creek, Canada

[21] Appl. No.: 533,237

[22] Filed: Sep. 25, 1995

[51] Int. Cl.$^6$ ............................ C05F 3/00; C05F 9/04; B09B 3/00; A62D 3/00
[52] U.S. Cl. .................. 71/15; 71/21; 71/23; 71/25; 71/903; 435/262; 435/262.5; 588/207
[58] Field of Search .................. 71/15, 21, 23, 71/25, 903; 435/262, 262.5; 588/207

[56] References Cited

U.S. PATENT DOCUMENTS

| | | | |
|---|---|---|---|
| 5,455,173 | 10/1995 | Crawford et al. | 435/264 |
| 5,503,774 | 4/1996 | Brons et al. | 252/357 |

OTHER PUBLICATIONS

J.F. Parr and Smith "Degradation of DDT in an Everglades Muck as affected by Lime, Ferrous Iron & Anaerobiosis" Soil Science, 1974 pp. 45–52 (vol. 118 No. 1).

"Principles of Composting", Golueke; The Biocycle Guide to the Art of Science of Composting; Journal of Waste Recycling; The JG Press, Inc, 1991, pp. 14–27 no month.

"Microbiological Degradation of Pesticides in Yard Waste Composting", Fogarty et al, Microbiological Reviews, 1991, pp. 225–233.

"Disposing of Organic Hazardous Waste by Composting", Savage et al., Biocycle Jan./Feb. 1985 pp. 31–34.

"Anaerobic DDT Biodegradation: Enhancement by Allocation of Surfactants and Low Oxidation Reduction Potential", Applied and Environment Microbiology, Dec. 1994 You et al., pp. 1–35.

"Anaerobic DDT Degradation of Contaminated Soil by Mixed Consortia and Enhancement By Surfactant Addition in Slurry Reactors", You et al., Water Environment Federation, Oct. 1994, pp. 635–645.

*Primary Examiner*—Ferris Lander

[57] ABSTRACT

The present invention provides a process of decontaminating soil and/or sediments containing DDT type contaminants by converting these contaminants into harmless materials thereby decontaminating the soil to whatever extent desired, either partial decontamiation or complete remediation. The process comprises treating solid and/or sediment which contains populations of viable anaerobic and aerobic microbes capable of transforming DDT type contaminants into harmless materials and being viable under both anaerobic and aerobic conditions.

24 Claims, No Drawings

COMPOST DECONTAMINATION OF DDT CONTAMINATED SOIL

BACKGROUND OF THE INVENTION

This invention relates to a controlled composting process for decontaminating soil or sediments containing DDT contaminants.

Numerous land sites exist that are contaminated with the insecticide DDT (1,1,1-trichloro-2,2-bis(p-chlorophenyl) ethane). Various methods have been used to decrease the contamination of the soil including incineration, low temperature thermal desorption and chemical treatments. All of these methods are extremely expensive and may not be suitable for many contaminated sites.

Prior art papers disclose laboratory experiments in biodegradation of DDT in soil slurries. They disclose admixing DDT contaminated soil with municipal treatment plant anaerobic sludge, a non-ionic surfactant and a reducing agent in an aqueous liquid system. Significant biodegradation of DDT occurred in these experiments, but toxic metabolites of DDT remained.

SUMMARY OF THE INVENTION

The present invention provides a process of decontaminating soil and/or sediments containing DDT type contaminants by converting these contaminants into harmless materials thereby decontaminating the soil to whatever extent desired, either partial decontamiation or complete remediation. The process comprises treating solid and/or sediment which contains populations of viable anaerobic and aerobic microbes capable of transforming DDT type contaminants into harmless materials and being viable under both anaerobic and aerobic conditions. The treatment comprises admixing the soil with amendment material to form a solid compost mixture containing organic nutrient materials; composting said mixture while maintaining the temperature of the compost mixture in the range of about 20° C. to 65° C. and the water content of the compost mixture in the range of about 40% to 100% WHC; during this composting maintaining the redox potential of the compost mixture below about negative 200 mV until a significant amount of DDT type contaminants is degraded; and thereafter oxygenating the compost mixture to raise the redox potential level of the compost mixture to above about positive 100 mV, and maintaining the redox potential level above about positive 100 mV until a significant amount of DDT type contaminants is degraded. The sequence of stages of negative/positive redox potential levels can be repeated as desired to yield soil containing little or no undesirable DDT type contaminants, these having been converted to harmless products.

DESCRIPTION OF THE INVENTION

The term "composting" as used herein in describing the decontamination process of the present invention means transforming by degradation DDT type contaminants in the soil and/or sediment to harmless materials utilizing biological activity, the process being carried out in the solid state with the addition of organic nutrient material.

"DDT type contaminants" means 1,1,1-trichloro-2,2-bis (p-chlorophenyl) ethane (DDT); 1,1,dichloro-2,2-bis(p-chlorophenyl) ethane (DDD); 2,2-bis(p-chlorophenyl)1,1-dichloroethylene, (DDE); and metabolic transformation products of DDT, DDD and DDE including 1-chloro-2,2-bis(p-chlorophenyl) ethylene (DDMU), 2,2-bis(p-chlorophenyl) ethylene (DDOH), dichlorodiphenylmethane (DPM), dichlorobenzophenone (DBP), dichlorobenzydrol (DBZ), and unsym-bis(p-chlorophenyl) ethylen dichlorophenzlacetate (DDA). Some DDT type contaminants are present in the soil before decontamination by the present process; some may be formed as transformation products during the present process.

"Harmless materials" are materials that are unobjectionable in the concentrations present in soil or sediment for its intended use.

"Decontamination" means transforming DDT type contaminants to harmless materials, including biodegrading said contaminants and binding said contaminants to soil or other material.

"Remediation" means decontamination to an unobjectionable level of DDT type contaminants in the soil for the intended use of the soil.

"Soil" means earth, i.e. humus, sand and particulate rock, and includes sediment from beneath the surface of water.

In the process of the present invention, during composting the soil to be decontaminated must contain appropriate types of indigenous viable microbes capable of degrading DDT type contaminants. These microbes must be viable under both the anaerobic and aerobic conditions to which they will be subjected during the present process. The microbes normally are bacteria, fungi, actinomycetes and to a lesser extent protozoa. The microbes preferably are indigenous to the contaminated soil, that is, they are present in the soil to be decontaminated; or they are recycled from, or along with, soil already subjected to the present process. In some cases it may be beneficial to add an inoculant containing such viable DDT-degrading microbes.

In the practice of the present invention a solid compost mixture is prepared by mixing appropriate soil amendment into the soil to be decontaminated, in an amount of at least about 10%, and up to 95% by weight of the mixture, and preferably from about 30% to 70% by weight amendment. The soil amendment material comprises a conventional source of organic nutrients for composting. The preferred amendment nutrient materials are agricultural waste and municipal waste sludge, preferably a manure such as horse, cow, sheep, turkey, chicken or fish manure, or activated sludge. Alfalfa, hay, sawdust, straw, peat, grass and other bulking materials preferably also are included in the amendment material, and may originate in manure or be specifically added. In some cases it may be desirable to add into the soil amendment a surfactant, preferably a formulated anionic and nonionic surfactant mixture, to render the DDT contaminants more available to biological degradation. Suitable surfactants include polysorbates, octoxynols, anionic alkyl sulfates, anionic alkyl aryl sulfonates and ethoxylates. Examples of suitable surfactants include "Tween" nonionic surfactants which are commercially available from ICI Americas, Inc., "Triton" nonionic surfactants which are commercially available from Union Carbide and "DAWN" detergent nonionic surfactant mixture which is commercially available from Procter & Gamble. A suitable mixture of surfactants is "Triton" X-100 and "DAWN". The amendment material may also contain, or be supplemented with, liquid or solid organic or inorganic nutrients. Organic materials high in nitrates and phosphates are normally used.

The compost mixture is maintained in a moist but solid state. Throughout the process the moisture level is maintained at less than 100% of the mixture's water holding capacity (WHC), preferably in the range of about 40% to 100% WHC.

After mixing, biological degradation of organic matter in the mixture starts, raising the temperature and depleting the oxygen to an anaerobic condition. The temperature of the mixture is thereafter maintained within the range of about 20° C. to 65° C. This is easily done by controlled air movement through the compost mixture (e.g. through pipes) and/or by the addition of nutrient material. Below about 20° C., the biodegradation proceeds uneconomically slowly; above about 65° C. excessive bacteria kill may take place. The preferred temperature range is within about 30° C. to 55° C. This high temperature range gives very rapid degradation of DDT, DDD and DDE. The aerobic microbes in the compost mixture remain viable for the subsequent aerobic degradation step and the anaerobic bacteria remain viable for any needed subsequent anaerobic degradation steps. Thus, it is essential that viable aerobic and anaerobic degradation microbes be maintained during the process of the present invention.

During the anaerobic step a low redox potential level is maintained in the compost mixture, below about negative 200 mV, and preferably within the range of about negative 300 mV to 500 mV. This level has been found to be optimum for the anaerobic degradation of DDT type contaminants in the present composting process. Not intending to be bound by the following theory, at less negative redox potential levels, apparently too much oxygen is present for rapid DDT degradation. The redox potential level can be maintained within this range by moist air movement through the compost and/or by the addition of conventional reducing agents such as sulphite and acetate compounds.

The first anaerobic step and any subsequent anaerobic steps are continued until a significant amount of DDT type contaminants is degraded. This can be determined by analysis. Typically, in the first anaerobic step degradation of about 20% to 50% of the initial content of DDT type contaminants is desirable.

After the DDT type contaminant content of the soil/manure mixture is decreased significantly in first anaerobic step, the mixture is oxygenated by any suitable means, preferably by air fed through and/or mixed with the mixture to achieve aerobic conditions. Oxygenation is sufficient for the redox potential level during the aerobic step to be maintained above about positive 100 mV. The aerobic conditions activate degradation of the DDT metabolites, primarily to compounds containing not more than one chlorine atom bonded to the aliphatic carbon atom, yielding harmless materials. The aerobic degradation step is continued until a significant amount of DDT type contaminants is degraded.

In most cases, the desired degree of biodegradation of DDT type contaminants for acceptable remediation will not be achieved in the first anaerobic/aerobic treatment sequence. In the highly preferred process, the sequence is therefore repeated one or more times as needed for acceptable soil remediation. Substantially complete decontamination from DDT type contaminants is readily achievable by this multi-sequence preferred process.

Not intending to be bound by the following theory, it is believed that during anaerobic degradation the anaerobic microbes remove at least one or two aliphatic chlorines from DDT type contaminants. The toxic metabolites, primarily DDD and to a lesser extent DDE are the initial anaerobic step biodegradation products of DDT. Further aerobic degradation reduces these to less toxic metabolites, primarily DDMU and DDOH, DPM, DBP, DBH and DDA. Since significant quantities of DDT type contaminants, particularly metabolites, may also be bound to soil and/or organic materials producing harmless materials, the term "degradation" as used herein includes not only biodegradation but also such binding of contaminants.

A desirable feature of this process is that the DDT-degrading microbes are maintained viable throughout the anaerobic/aerobic treatment cycles, so that it is not essential that microbes be supplemented before repeating the treatment cycle. However, it may be desirable to add more nutrient materials, manure, or other conventional fermentation ingredients, primarily to supplement the organic feed supply and to also introduce more bulking agent.

As aforementioned, maintaining the proper redox potential levels of the compost mixture in the anaerobic and aerobic steps is necessary for efficient practice of the present invention. The appropriate redox potential levels can be maintained by the addition of conventional nutrient materials and/or reducing agents such as sulphite and/or acetate compounds. Absolute anaerobic and aerobic conditions are needed (although short localized excursions can be expected). For the purpose of defining the present invention, a redox potential level of less than about negative 200 mV is considered anaerobic, and is required for the anaerobic steps; and a redox potential level greater than about positive 100 mV, is considered aerobic and is required for the aerobic steps. During the anaerobic steps, the preferred redox potential level is in the range of about negative 300 to 500 mV; and during the aerobic steps it is in the range of about positive 200 to 300 mV. The redox potential level from about negative 200 mV to about positive 100 mV is considered anoxic. In the present process, when going from anaerobic to aerobic conditions, and vice versa, anoxic conditions are present in the compost. During this period, degradation of some DDT type contaminants appears to take place, but at low rates. Thus, speedy transition from one state to the other expedites overall degradation.

In the practice of the present invention, it may be desirable to have anaerobic conditions in some parts of the compost and at the same time aerobic conditions in other parts. This may be desirable because of different initial contaminant levels and/or degradation rates in different parts of the compost mixture. Thus, to approach uniform degradation, it may be necessary that some parts of the compost remain longer in an anaerobic or an aerobic state.

During composting high microbe counts are present, preferably up to $10^8$ aerobic culture forming units per gram, as measured by standard plate count techniques (cfu), and up to $10^6$ anaerobic cfu/g. These microbe counts of course include microbes other than those that degrade DDT type contaminants.

Experience has shown that during composting the DDD content may initially increase, as expected from the initial DDT degradation to DDD. The DDE concentration has not shown this increase. Both DDD and DDE then decrease to acceptably low levels at the end of the present composting process.

In practice the present process is conducted in a compost pile, normally in a container cell or windrow. The soil to be treated can be analyzed and composted in the laboratory to determine optimum composting conditions, amendment composition, and anaerobic/aerobic treatment times and number of sequences. Typically for soil contaminated with up to 600 ppm of DDT, 3 sequences of 2 weeks anaerobic composting followed by 2 weeks of aerobic composting have successfully decontaminated one ton batches of soil down to contaminant levels of less than 140 ppm DDT with no net production of DDD or DDE.

As above described, the present process involves an anaerobic composting stage followed by an aerobic stage. This sequence appears necessary to degrade DDT metabolites. However, it may be desirable to initially treat the soil aerobically to lower the content of pre-existing DDT metabolites prior to the initial anaerobic stage.

The following Examples are illustrative of the practice of the present Invention:

EXAMPLE 1

This example shows the present invention composting process used to decrease DDT contamination within 7 weeks in soil from a pesticide-contaminated site. The soil contained an indigenous population of viable anaerobic and aerobic microbes capable of rendering DDT type contaminants harmless and being viable under both anaerobic and aerobic conditions.

Soil from an area contaminated with DDT (180 ppm) was mixed with straw and cattle manure in the proportion of 55/5/40 by weight, calculated on a dry weight basis of the mixture. Approximately 6.5 Kg batches of this solid compost mixture was then packed into duplicate cylindrical polyvinyl chloride lysimeter composters (1.2 m length by 10.2 cm id), on top of a 10 cm deep gravel drainage bed. Ammonium nitrate was added to bring the carbon:nitrogen ratio to 100:28. Two sterile control lysimeters were also prepared containing approximately 6.5 Kg of the contaminated soil that was sterilized by the addition of 1000 ppm mercuric chloride.

During the test period the test and control lysimeters were maintained at 40–60% of WHC (water holding capacity) by addition of water at the top of the composters. Temperature was in the range of 20° C. to 55° C. during the test period. All 4 lysimeters were initially aerated from the bottom of the lysimeters for 7 days at the rate of 44 liters/tonne/day, giving aerobic conditions. Thereafter aeration was stopped for 7 days, during which time conditions of the compost mixture were anaerobic. The pH was monitored throughout the treatment and stayed within the range of 7.3 to 7.8. The aerobic microbial population was $10^6$ to $10^8$ cfu/g as measured by a standard plate count techniques. The lysimeters were again aerated for 7 days giving strongly aerobic conditions.

The anaerobic/aerobic two week sequences were continued until seven weeks had elapsed. Thereafter soil samples were taken from the composter and control lysimeters. The soil samples were extracted with methylene chloride. The extracts were quantified by GC analysis with an ECD detector after solvent exchange. Results are shown in Table 1 below.

TABLE 1

Percentage Reduction in Extractable DDT After Composting

| Test # | Treatment | Reduction in DDT |
|---|---|---|
| 1 | Sterile Control | 0% |
| 2 | Sterile Control | 4.7% |
| 3 | Composter 1 | 78.7% |
| 4 | Composter 2 | 53.8% |

EXAMPLE 2

This example illustrates the use of several amendment blends of peat, cattle manure and straw to promote DDT degradation in soil during lab-scale composting.

In this study soil from a DDT-contaminated (180 ppm DDT) site was mixed with the various amendment blends, and the mixtures added to laboratory scale composters, approximately 65 g of compost mixture in each test composter.

During the study the test composters were alternately oxygenated for 5 days with air and then 2 days with nitrogen (0.5 litres per minute, LPM) from below the soil mixture alternately giving highly aerobic and anaerobic conditions. Because the volume of the soil was too low for metabolic processes to cause heating, the experiment was contained in an incubator which temperature was gradually increased from 25° C.–55° C. Moisture was maintained at 60% to 80% WHC, achieved by twice weekly manual addition of water and mixing. The pH was allowed to fluctuate and varied from 5.25 to 9.0. After 54 days the study was discontinued, and the decrease in DDT concentration of the treated compost mixture, compared with the initial soil DDT concentration, was determined as in Example 1 and is reported in Table 2.

TABLE 2

The Use of Various Amendments to Increase DDT Degradation During Composting

| Test # | Composition of Compost Mixture | | | | Reduction in DDT |
|---|---|---|---|---|---|
| | SOIL | PEAT* | MANURE | STRAW | |
| 5 | 25 | 1 | 37 | 37 | 91.0% |
| 6 | 35 | 0 | 65 | 0 | 56.9% |
| 7 | 45 | 0 | 45 | 10 | 96.1% |
| 8 | 50 | 0 | 20 | 30 | 96.3% |
| 9 | 60 | 0 | 35 | 5 | 93.0% |
| 10 | 60 | 0 | 40 | 0 | 98.0% |

*The peat used was Sphagnum peat moss.

EXAMPLE 3

This example illustrates the use of different ranges of peat, cattle manure and straw amendments with DDT-contaminated soil to promote degradation of DDT, DDD and DDE during a composting process.

In this study soil from a site containing DDT type contaminants, (180 ppm DDT, 46 ppm DDD, 35.5 ppm DDE) was mixed with the various amendment blends, and the compost mixtures added to lab scale composters, approximately 65 g of compost mixture in each test composter.

The composters were put on a 5 day air followed by 2 day nitrogen sequence (1 liter per minute) for 54 days giving alternately highly aerobic and highly anaerobic conditions in the compost mixtures. As the volume of the soil was too low for metabolic processes to cause heating, the experiment was contained in an incubator which temperature was gradually increased from 25° C. to 55° C. Soil pH was monitored and found to range from 6 to 8. Moisture was maintained at 60 to 80% WHC and maintained by twice weekly manual water addition and mixing. After 54 days, the reduction in DDT, DDD and DDE content was determined and is reported in Table 3.

TABLE 3

Percent Contaminant Reductions

| Test # | Compost Mixture Composition, % by weight | DDT | DDD | DDE |
|---|---|---|---|---|
| 11 | 10:1:45:45 (soil:peat:manure:straw) | 89% | 60% | 65% |
| 12 | 25:1:37:37 (soil:peat:manure:straw) | 85% | 51% | 67% |
| 13 | 25:20:35:20 (soil:peat:manure:straw) | 73% | 49% | 67% |

EXAMPLE 4

This example shows large scale composting of DDT contaminated soil. 8 tons of contaminated soil (536 ppm DDT, 73 ppm DDD, and 36 ppm DDE) mixed with cow manure 40% volume by volume, and straw (5%) volume by volume and placed in a composting box (8'×8'×8') with 2 sets of aeration piping, one at the base and one 3' above the base. After 2 days the temperature in the soil had increased to above 40° C. and remained at this temperature for at least 2 weeks then dropped to 30° C. in the 3rd and 4th weeks. For one month the system was in an anaerobic state to enhance the initial dechlorination steps (redox less than minus 400 mV). This was followed by 1 week aerobic and one week anaerobic cycles during which the redox quickly changed from greater than positive 200 mV during the aerobic stages to less than minus 400 mV during the anaerobic stages. During the treatment the soil water content fluctuated between 40% and 100% WHC.

After the initial 4 weeks, the DDT level had dropped to 264 ppm (50.7% remaining) and after a total of 12 weeks to 140 ppm DDT (26% remaining as measured by the procedure of Example 1). No buildup of the major metabolites DDD and DDE was seen after the 12 week period.

EXAMPLE 5

The procedure of Example 1 is followed, except using the bulking and nutrient materials listed in Table 4 for soil amendments a to d in place of the straw and cattle manure in Example 1. As in Example 1, 55/5/40 soil/bulking material/nutrient material by weight compost mixture are used.

Composition of Amendments
(55/5/40 weight proportions)

a. soil:alfalfa:sheep manure
b. soil:hay:turkey manure
c. soil:sawdust:chicken manure
c. soil:grass:activated sludge During the seven weeks composting, significant decrease in DDT content of the soil occurs without significant increase of DDD and DDE.

What is claimed:

1. The process of decontamination of soil containing DDT type contaminants which soil contains populations of viable anaerobic and aerobic microbes capable of transforming DDT type contaminants into harmless materials and being viable under both anaerobic and aerobic conditions comprising:

(a) admixing said soil with amendment material to form a solid compost mixture containing organic nutrient materials;

(b) composting said soil while maintaining the temperature of the compost mixture in the range of about 20° C. to 65° C. and the water content of the compost mixture in the range of about 40% to 100% WHC;

(c) during said composting maintaining the redox potential level of the compost mixture below about negative 200 mV until a significant amount of DDT type contaminants is degraded; and (d) thereafter oxygenating the compost mixture to raise the redox potential level of the compost mixture to above about positive 100 mV, and maintaining the redox potential level above about positive 100 until a significant amount of DDT type contaminants is degraded.

2. The process of claim 1 wherein the sequence of steps (a) to (d) are repeated.

3. The process of claim 1 wherein the sequence of steps (b) through (d) are repeated.

4. The process of claim 1 wherein said compost mixture initially contains at least about 10% by weight of amendment material.

5. The process of claim 1 wherein the amendment material comprises agricultural waste or municipal waste sludge.

6. The process of claim 1 wherein said amendment material comprises a bulking material.

7. The process of claim 1 wherein said amendment material comprises a nutrient material selected from the group consisting of horse, cow, sheep, fish, turkey, and chicken manures and activated sludge.

8. The process of claim 1 wherein said amendment material comprises a bulking material selected from the group consisting of straw, peat, alfalfa, hay, sawdust and grass.

9. The process of claim 1 wherein said compost mixture initially contains in the range of 30–70% by weight of said amendment material.

10. The process of claim 1 wherein a surfactant is added to said compost mixture.

11. The process of claim 1 wherein a surfactant from the group consisting of non-ionic surfactants and anionic surfactants is added to said compost mixture.

12. The process of claim 1 wherein said temperature is in the range of about 30° C. to 55° C.

13. The process of claim 1 wherein when said redox potential level is below negative 200 mV it is maintained in the range of about negative 300 mV to 500 mV, and when said redox potential level is above about positive 100 mV it is maintained in the range of about positive 200 to 300 mV.

14. The process of decontamination of soil containing DDT type contaminants which soil contains populations of viable anaerobic and aerobic microbes capable of transforming DDT type contaminants into harmless materials and being viable under both anaerobic and aerobic conditions comprising:

(a) admixing said soil with amendment material comprising agricultural waste or municipal waste sludge to form a solid compost mixture containing organic nutrient materials wherein said compost mixture contains at least about 10% by weight of amendment material;

(b) composting said soil while maintaining the temperature of the compost mixture in the range of about 20° C. to 65° C. and the water content of the compost mixture in the range of about 40% to 100% WHC;

(c) during said composting maintaining the redox potential level of the compost mixture below about negative 200 mV until a significant amount of DDT type contaminants is degraded; and (d) thereafter oxygenating the compost mixture to raise the redox potential level of the compost mixture to above about positive 100 mV, and maintaining the redox potential level above about positive 100 until a significant amount of DDT type contaminants is degraded.

15. The process of claim 14 wherein the sequence of steps (a) to (d) are repeated.

16. The process of claim 14 wherein the sequence of steps (b) through (d) are repeated.

17. The process of claim 14 wherein said amendment material further comprises a bulking material.

18. The process of claim 14 wherein said amendment material comprises a nutrient material selected from the group consisting of horse, cow, sheep, fish, turkey, and chicken manures and activated sludge.

19. The process of claim 14 wherein said amendment material further comprises a bulking material selected from the group consisting of straw, peat, alfalfa, hay, sawdust and grass.

20. The process of claim 14 wherein said compost mixture initially contains in the range of 30–70% by weight of said amendment material.

21. The process of claim 14 wherein a surfactant is added to said compost mixture.

22. The process of claim 14 wherein a surfactant from the group consisting of nonionic surfactants and anionic surfactants is added to said compost mixture.

23. The process of claim 14 wherein said temperature is in the range of about 30° C. to 55° C.

24. The process of claim 14 wherein when said redox potential level is below negative 200 mV it is maintained in the range of about negative 300 mV to 500 mV, and when said redox potential level is above about positive 100 mV it is maintained in the range of about positive 200 to 300 mV.

* * * * *